United States Patent
Arsenius et al.

[15] 3,675,977
[45] July 11, 1972

[54] BEARING FOR SUPPORTING HEAVY ROTATING MACHINERY

[72] Inventors: Torsten Henry Arsenius; Carl Göran Albin Hällstedt, both of Göteborg, Sweden

[73] Assignee: SKF Industrial Trading and Development Company N.W., Amsterdam, Netherlands

[22] Filed: Oct. 2, 1970

[21] Appl. No.: 77,436

[52] U.S. Cl. ............................................................. 308/9
[51] Int. Cl. ........................................................ F16c 17/16
[58] Field of Search ........................................ 308/9, 122, 73

[56] References Cited

UNITED STATES PATENTS 3,093,426  6/1963  Cornford ............................. 308/73

Primary Examiner—Edgar W. Geoghegan
Assistant Examiner—Frank Susko
Attorney—Howson and Howson

[57] ABSTRACT

A hydrostatic bearing for heavy rotating machinery contains a number of bearing blocks, each consisting of a fixed base plate and a top plate which is movable in relation thereto. The bearing blocks cooperate with a race ring in the machinery, and are hydraulically interconnected in one or more groups. One block within each group will serve as reference unit with respect to the clearance between the blocks and race ring, and an automatic adjustment of the clearance will occur if the race ring due to changes in load and/or temperature will temporarily change its shape and/or its position.

7 Claims, 5 Drawing Figures

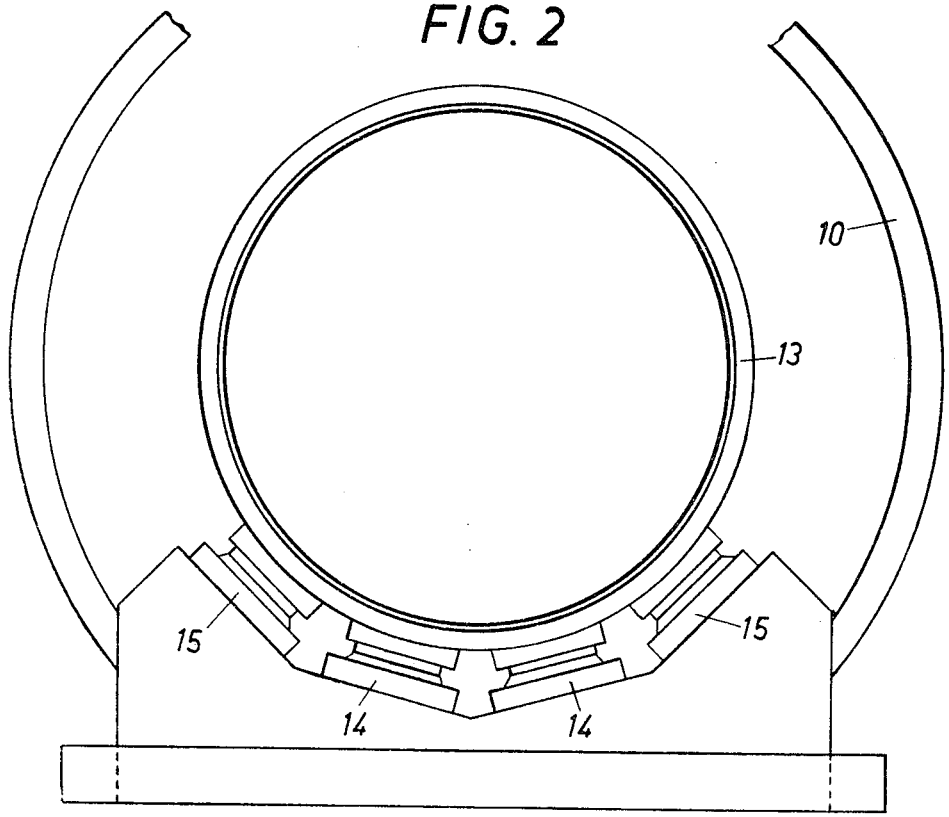
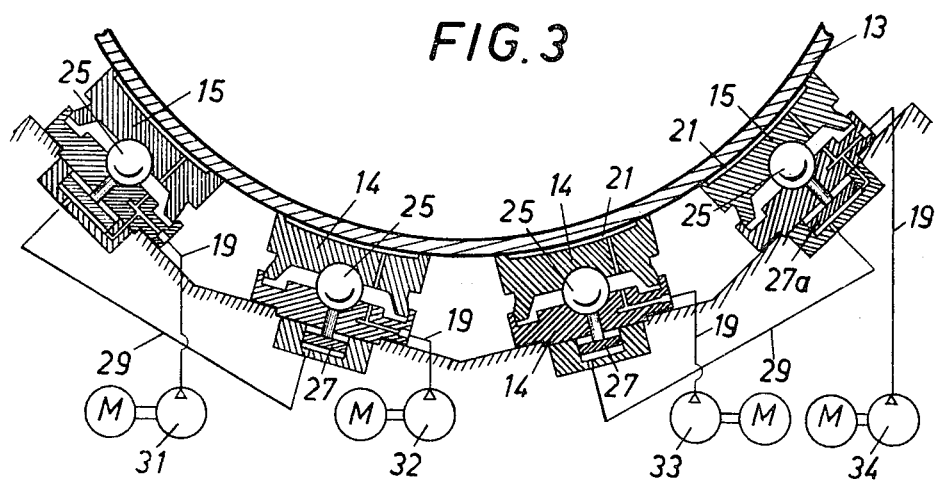

BEARING FOR SUPPORTING HEAVY ROTATING MACHINERY

BACKGROUND OF THE INVENTION

With stone crushers of the kind used in the mining industry it is desirable to increase the dimensions of the rotating cylinders and of the inlets thereto in order to be able to take care of large blocks of the base material. This means that the bearings supporting these units will have to be very large. Rolling bearings and journal bearings have been used, as well as bearings containing support rollers. The mills, which often are very long, are subjected to bending deformations caused by the load, and noticeable longitudinal changes will be brought about by variations in the temperature. This means that the journalling of such mills will involve big problems. When rolling bearings are used the size will by itself be a problem as a diameter of the opening of 2,5 meters is often asked for. With hydrodynamic journal bearings it is difficult to obtain sufficient carrying capacity, and the wear is too big due to the slow speed. When the race ring is carried by support rollers great local loads will occur at the ends of the rollers due to the bending deformation of the mill cylinder. This may be avoided by crowning the race surface, but what will bring about high contact pressures. On both occasions flaking will occur. If the hardness of the ring and the rollers is increased to avoid this fatigue ruptures will usually appear in the race ring.

The present invention refers to a bearing including hydrostatic means which will reduce the difficulties above mentioned.

With hydrostatic bearings the flow of fluid is proportional to the third power of the height of the clearance. To obtain a reasonable flow of fluid through bearings of the size actual here clearances of some tenths of a millimeter are required, and it is evident, that such clearances are difficult to obtain with bearings of this size. Working tolerances, temperature differences and deformations caused by the load make it practically impossible to guarantee the correct clearances with bearing of a size suitable to cope with the high loads encountered. The aim of the present invention is to bring about an automatic adjustment of the clearances during use.

SUMMARY OF THE INVENTION

The invention is characterized in that a race ring in the bearing is supported by a number of hydrostatic bearing units, that the supporting plane of each unit is self-aligning with respect to the envelope surface of the race ring and by that the units of the bearing are interconnected hydraulically in such a manner that an automatic adjustment of the distance between the race ring and the bearing units is obtained, irrespective of momentary changes in the shape and/or the position of the race ring.

BRIEF DESCRIPTION OF THE DRAWINGS

FIG. 2 is an end view of the hydrostatic bearing;

FIG. 3 shows the hydraulic connections at the bearing;

Figure 1:
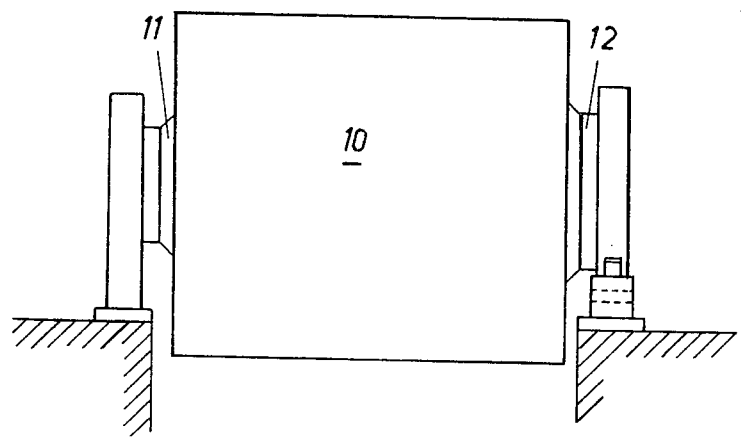
FIG. 1 is an elevation of a stone crusher provided with bearings according to the invention.

The stone crusher shown in FIG. 1 consists of a rotatable cylinder, which is driven by means of mechanical devices not shown here, and the shaft ends of which 12 are carried by bearings of the kind to be described below. The material to be treated in the mill is supplied through the right, hollow shaft end 12.

This shaft end 12 is in the manner shown in FIG. 2 provided with a race ring 13. This ring is carried by four bearing units, here denoted by 14 and 15 respectively, which are mounted on a common base. The bearing units are basically of the same design, but as will appear below, minor differences will be found between units of type 14 and of type 15, respectively.

Figure 4:
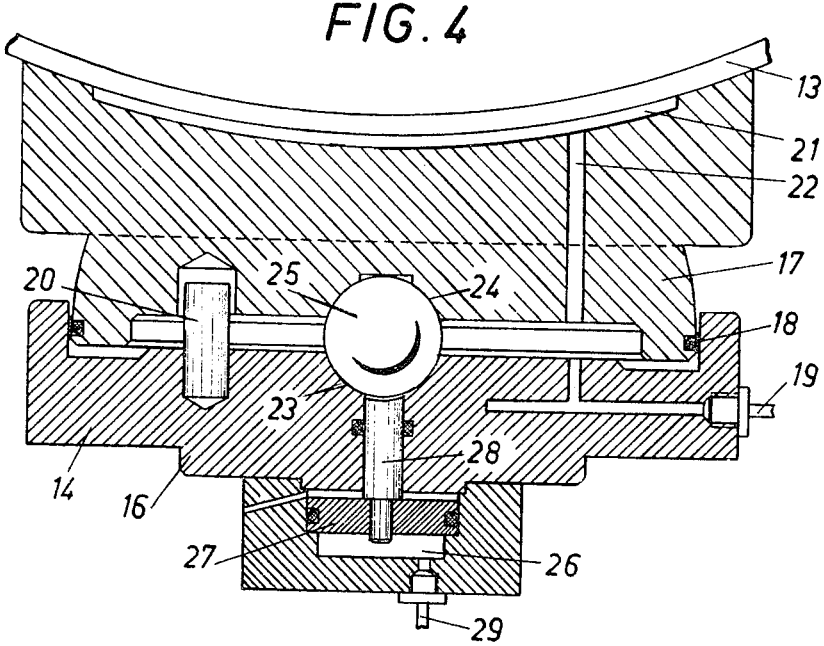
FIG. 4 is a cross section through one of the two center units.
Figure 5:
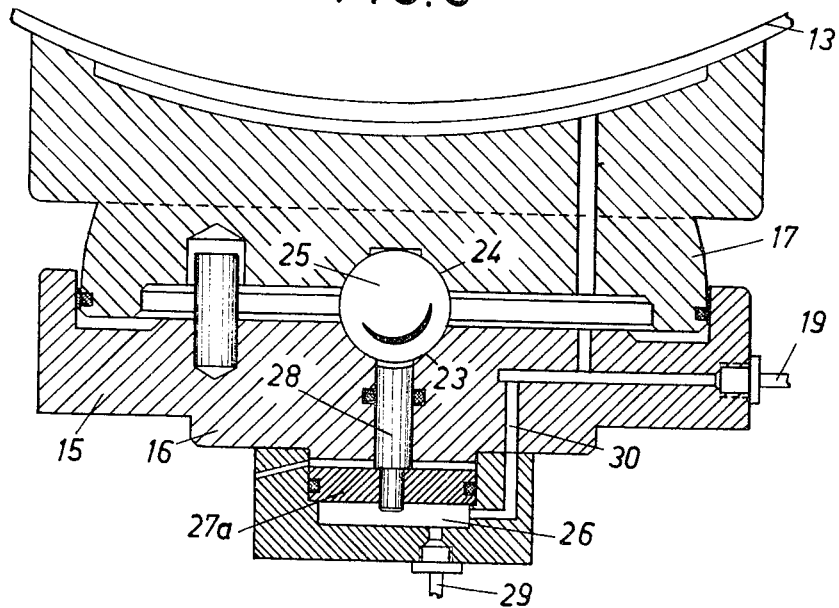
FIG. 5 is a cross section through one of the outer units.

Both types of units are shown in FIGS. 4 and 5, where FIG. 4 shows a bearing of type 14, and FIG. 5 shows a unit of type 15. Each bearing unit is composed of a base plate 16, the face of which remote from the base is shaped as a cylinder. The top part 17 of each unit is shaped as a piston, and works in this cylinder. The top part 17 of each unit is shaped as a piston, and works in this cylinder. The top part is formed as a portion of a sphere in order to make possible an angular displacement of the top part within the cylinder, and is provided with a sealing ring 18. It may be displaced axially with respect to the base plate, when a pressure fluid is supplied to the cylinder by way of a conduit 19. The load resting on the unit will hereby to an essential part be carried by this pressure fluid, which acts between the top part and the base plate. In order to prevent the top part from turning in relation to the base plate, a peg 20 is provided, which is mounted in the base plate and fits into a recess in the top part. The face of the top part turned towards the race ring 13 is shaped to suit the envelope surface of the ring, and it is provided with a pocket 21, which covers an essential part of the above-mentioned surface turned towards the ring. This pocket is by way of a passage 22 in communication with the space between the base plate and the top part and thus with the supply conduit 19. In use the clearance between the marginal portion surrounding the pocket and the race ring must be kept constant within reasonable limits, and this clearance will determine the outflow from and thus the pressure within the pocket 21.

In the center of the face of the base plate turned towards the top part a ball-shaped seat 23 is provided, and in the juxtaposed face of the top part a corresponding seat 24 is provided. A ball 25 is fitted into these seats and will when the fluid pressure is removed mechanically transfer any load resting upon the top part 17 to the base plate.

A further cylinder 26 is formed in the lower part of each base plate, and a piston 27 operates in this cylinder. This piston is provided with a piston rod 28, the upper end which is bowl-shaped and designed to contact the ball 25. When the cylinder 26 is subjected to pressure by fluid being supplied by way of a conduit 29, or with respect to unit 15 by way of a passage 30 being in connection with the pressure fluid supply conduit 19, the piston rod will lift the ball from its seat 23 in the base plate.

The difference between units 14 and 15 is, as is evident from a comparison between FIGS. 4 and 5, that the piston 27a in units of type 15 has a somewhat bigger diameter than the piston 27 in the units of type 14, and further that the cylinder 26 in unit 15 by way of the passage 30 communicates with the supply conduit 19. Each bearing will thus contain two groups of units. In both types the cylinders 26 is each provided with a stop at which the pertaining piston 27 and 27a, respectively, will rest when the pressure is removed.

The piston 27a in unit of type 15 has a shorter stroke than the piston in unit of type 14. As the first mentioned piston has a larger area it will be maintained in its upper position by the pressure fluid and it will thereby serve as a reference unit for the other unit in the same group.

As above mentioned it is of deciding importance that the clearance be maintained constant at the different bearing units. By providing a ball 25 in the center of the cooperating surfaces between base plate and top part, the latter will automatically be adjusted with respect to the race ring. The portion of the top part extending into the base plate and serving as a piston is formed like a portion of a sphere in order to make possible an angular adjustment of the top part with respect to the base plate. The combined area of the piston formed by the top part and the pertaining piston 27 in the base plate is such that it will correspond to the efficient bearing surface between the top part and the race ring. Furthermore, the relation between the two pistons mentioned in the same unit is so chosen that it corresponds to the relation between the part of the load which is desired be carried by the fluid at the top part, and that to be transferred by the ball 25. It should be pointed that in the use the ball will rest on the bowl-shaped end of the piston rod 28, whereby a small frictional resistance only must be overcome during the angular displacement of the top part.

The hydraulic system is shown in FIG. 3. Here one bearing unit 15 and one bearing unit 14 to each side of a vertical plane through the bearing axis are interconnected to a group. Each unit is supplied with pressure fluid from a pump 31, 32,33, and 34, respectively, driven in arbitrary manner, conduits 19 running from each pump to the pertaining unit. As is further evident from the drawing the space below a piston 27a in unit 15 communicates directly with the supply conduit 19 to the unit, and both units in the group are interconnected by a passage 29. The under side of piston 27 in unit 14, however, has no connection with the supply conduit 19 to this unit.

Due to the bigger area of piston 27a and the comparatively shorter stroke thereof, this piston will be brought to its top position while simultaneously piston 27 in unit 14 will balance in an intermediate position.

If now for example one unit of type 15 will be subjected to a higher load than the other units, the clearance between the top part of this particular unit and the race ring will decrease. The pressure in the pertaining pocket 21 will then rise, as the normal outflow cannot occur, and this pressure is a transferred by way of passage 30 and passage 29 to the space below piston 27. As piston 27a in unit 15 already has been brought to its top position the increased pressure will have no influence on the position of ball 25 in unit 15. Due to the increased pressure below piston 27 piston rod 28 and ball 25 of unit 14 will be pushed upwards bringing the pertaining top part closer to the race ring in such a manner that the clearance therebetween will be decreased, and a higher pressure will occur in the pertaining pocket 21. A final position will be reached when both units 14 and 15 take care of the same part of the load, and thus show a similar clearance at the race ring. As the pressure changes in pocket 21 of unit 15 primarily influence piston 27 only the system will have great dampening properties.

If the pressure is removed while the mill is at standstill, the top parts of the various units will sink down to a bottom position, in which the ball 25 will rest in their seats 23 in the base plates. On such an occasion the balls will have to take care of the loads resting on the bearing. The seats in the base plates are sufficient to guarantee contact pressures of acceptable values. Any angular displacement of the top parts is not actual as the balls already when they sink down in their seat have the correct positions. When fluid is supplied once more the pressure will rise in all units, and the balls will be relieved by the pressures acting upon the top parts 17. Simultaneously the piston 27a in each of the two units 15 will be brought to contact with their upper stops. Distribution of the load between the individual units will thereafter automatically occur in the manner above described. It is of course possible to provide more than two units to each side of the vertical center plane. It is also possible to arrange one unit to type 15 centrally in the vertical plane as a reference unit for a number of units symmetrically arranged to both sides of the first mentioned unit.

With bearings subjected to very heavy loads and more difficult working conditions, it is of course possible to provide a larger number of units than those shown on the drawings.

We claim:

1. A bearing for supporting heavy rotating machinery in which a race ring is supported by a number of individual hydrostatic bearing units, each having a top part which is self-aligning with respect to the envelope surface of the race ring and in which the bearing units are hydraulically interconnected in such a manner that an automatic adjustment of the clearance between the race ring and the top parts of the individual bearing units is obtained, irrespective of occasional changes in the shape and/or the position of the race ring, each bearing unit including a fixed base plate, and a top part cooperating therewith, said base plate and said top part acting as piston and cylinder when supplied with a pressure fluid, the face of the top part remote from the base plate being designed to suit the envelope surface of the race ring and having a pocket connected to a source of pressure fluid supply.

2. The bearing according to claim 1, in which the adjacent faces of the base plate and of the top part is each provided with a seat adapted to receive a ball fitted between the top part and the base plate to transfer loads therebetween, when the fluid pressure is removed from the bearing.

3. The bearing according to claim 2, in which a piston fitted into a cylinder in each base plate is provided with a piston rod and is mounted in such a manner that it will lift the ball of the pertaining unit out of its seat in the base plate, when the cylinder is supplied with pressure fluid from the hydraulic system.

4. The bearing according to claim 1 in which all bearing units to each side of a vertical plane through the axis of the bearing are hydraulically interconnected.

5. The bearing according to claim 1, in which one bearing unit is mounted centrally in a vertical plane through the axis of the bearing and that further bearing units are arranged symmetrically with respect to the first mentioned unit and hydraulically connected thereto.

6. The bearing according to claim 3, in which the piston operating the ball in one particular unit of a group of interconnected units has a larger efficient area and shorter stroke than the pistons of the other units within the same group, and in that the piston in the first mentioned unit is operated directly by the pressure of the fluid supplied to that unit.

7. The bearing according to claim 1, in which each bearing unit is provided with its own pump driven independently of the pumps for the other units.

* * * * *